United States Patent
Sandell et al.

(10) Patent No.: US 9,460,323 B2
(45) Date of Patent: Oct. 4, 2016

(54) TAG POWERSAVE

(71) Applicant: Sony Corporation, Tokyo (JP)

(72) Inventors: Philip Sandell, Lund (SE); Lars Nord, Lund (SE); Heino Wendelrup, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 185 days.

(21) Appl. No.: 14/311,576

(22) Filed: Jun. 23, 2014

(65) Prior Publication Data

US 2015/0371068 A1    Dec. 24, 2015

(51) Int. Cl.
*G06K 19/07* (2006.01)
*G06K 7/10* (2006.01)

(52) U.S. Cl.
CPC ....... *G06K 7/10198* (2013.01); *G06K 19/0702* (2013.01); *G06K 19/0717* (2013.01); *G06K 19/0723* (2013.01)

(58) Field of Classification Search
None
See application file for complete search history.

(56) References Cited

U.S. PATENT DOCUMENTS

| | | | | |
|---|---|---|---|---|
| 7,511,601 | B2 * | 3/2009 | Eisenberg | G06K 17/00 340/10.1 |
| 7,518,502 | B2 * | 4/2009 | Austin | A61B 19/44 340/539.1 |
| 7,737,851 | B2 * | 6/2010 | Trosper | G06K 7/0008 340/10.1 |
| 7,889,058 | B2 * | 2/2011 | Suga | G06K 7/0008 340/10.2 |
| 7,944,401 | B2 * | 5/2011 | Gakhar | A41D 13/1281 343/718 |
| 8,031,053 | B2 * | 10/2011 | Greeff | G01K 1/024 340/10.1 |
| 8,400,297 | B2 * | 3/2013 | Tuttle | G06K 7/0008 340/10.33 |
| 8,471,706 | B2 * | 6/2013 | Schuster | G06Q 10/06 340/572.1 |
| 8,633,807 | B2 * | 1/2014 | Sano | G06K 7/10029 235/375 |
| 8,681,001 | B2 * | 3/2014 | Griesmann | G06K 7/10207 235/385 |
| 8,756,030 | B2 * | 6/2014 | Davis | H04W 84/18 702/176 |
| 2002/0087436 | A1 | 7/2002 | Guthrie et al. | |
| 2006/0290472 | A1 * | 12/2006 | Onderko | G06K 7/008 340/10.1 |
| 2007/0139199 | A1 | 6/2007 | Hanlon | |
| 2008/0191845 | A1 * | 8/2008 | Strzelczyk | G01S 13/825 340/10.5 |
| 2013/0201003 | A1 * | 8/2013 | Sabesan | G01S 7/42 340/10.1 |
| 2014/0277699 | A1 * | 9/2014 | Moix | G01N 35/04 700/230 |

FOREIGN PATENT DOCUMENTS

EP    2 662 799 A1    11/2013

OTHER PUBLICATIONS

PCT International Search Report and Written Opinion corresponding to PCT/JP2014/006373, Dated: Apr. 10, 2015; 10 Pages.

* cited by examiner

*Primary Examiner* — Brian Miller
(74) *Attorney, Agent, or Firm* — Myers Bigel & Sibley, P.A.

(57) ABSTRACT

A tag includes a communication interface that is configured to receive and transmit wireless transmissions, a movement detector and a digital logic circuit configured to perform operations. The operations may include broadcasting wireless transmissions comprising a tag ID of the tag from the communication interface according to a transmission pattern. A stationary movement pattern of the tag may be detected with the movement detector. The operations may further include adjusting the transmission pattern responsive to detecting the stationary movement pattern. A confirmation from a computing device indicating that information for the tag ID has been received by a server tracking the tag. The adjustment to the transmission pattern may also be responsive to receiving the confirmation. The tag broadcasts wireless transmissions according to the adjusted transmission pattern.

20 Claims, 6 Drawing Sheets

TAG POWERSAVE

FIELD

Embodiments of this invention relate to tag broadcast management.

BACKGROUND

Radio Frequency Identification (RFID) tags may be embedded in or attached to items that can store identification information and other details. Tags may be small devices, such as a label, with a miniature embedded antenna. A tag reader may interrogate the tag by transmitting an RFID signal, which energizes the embedded antenna to provide power for the tag to transmit a responsive RFID signal to the reader. Some tags may have a power source and/or circuitry to provide transmissions or broadcasts to be picked up by tag readers. Tag readers may be stationary or mobile.

RFID tags may be used to gather information for many commercial and consumer purposes. However, tags have limited energy resources and frequent broadcasting may exhaust power supplies. Also considering the increase in the number of tags, it is possible to consume available spectral bandwidth if many tags are broadcasting.

SUMMARY

According to some embodiments of the present invention, a tag may include a communication interface that is configured to receive and/or transmit wireless transmissions, a movement detector and an analog and/or digital logic circuit configured to perform operations. The operations may include repetitively broadcasting wireless transmissions comprising a tag identification (ID) of the tag from the communication interface, detecting a movement of the tag with the movement detector and adjusting the timing between the repetitive broadcasts based on the movement. Detecting a movement may include detecting less movement or a lack of movement.

According to some embodiments, the communication interface is further configured to receive wireless signals and the operations further comprise receiving a confirmation signal from a computing device indicating that information for the tag ID has been received by a server and adjusting the timing responsive to the confirmation signal and a determination that the movement does not satisfy a movement threshold. The confirmation may indicate that location information for the tag ID has been received by the server or another such computing device. The timing may be adjusted responsive to a time period between receipt of the confirmation signal and the determination satisfying a reliability time threshold.

According to some embodiments, the movement detector may be an accelerometer. Detecting the stationary movement pattern may include detecting a lack of movement using the accelerometer. The timing may be adjusted based on the detected lack of movement by the accelerometer.

According to some embodiments, adjusting the timing may include reducing how often the wireless transmissions are repetitively broadcast based on a determination that the movement does not satisfy a movement threshold. Broadcasts may be resumed as often as before the reduction in response to a determination that the movement satisfies the movement threshold following the reduction.

According to some embodiments, adjusting the timing may include preventing the broadcast of the wireless transmissions based on a determination that the movement does not satisfy a movement threshold. Broadcasts may be resumed following the prevention of broadcast of the wireless transmissions in response to a determination that the movement satisfies the movement threshold.

According to some embodiments, detecting a movement may include accumulating values indicative of an amount of determined movement during a defined interval. Adjusting the timing may include adjusting the timing between the repetitive broadcasts based on the amount of determined movement not satisfying a movement threshold.

According to some embodiments, the operations may further include determining a pattern of timing between movements of the tag and adjusting the timing between the repetitive broadcasts based on the determined pattern of timing.

According to some embodiments, adjusting the timing may include adjusting the timing based on expiration of a threshold time since movement of the tag was last detected.

According to some embodiments, a method may include repetitively broadcasting, from a communication interface of a tag, wireless transmissions comprising a tag ID of the tag and detecting, by a movement detector of the tag, a movement. The method may also include adjusting, by the tag, timing between the repetitive broadcasts based on the movement.

According to some embodiments, the method my include receiving a confirmation signal from a computing device indicating that information for the tag ID has been received by a server and adjusting the timing responsive to the confirmation signal and a determination that the movement does not satisfy a movement threshold. The confirmation may indicate that location information for the tag ID has been received by the server or another such computing device. The timing may be adjusted responsive to a time period between receipt of the confirmation signal and the determination satisfying a reliability time threshold.

According to some embodiments, the movement detector may be an accelerometer. Detecting the stationary movement pattern may include detecting a lack of movement using the accelerometer. The timing may be adjusted based on the detected lack of movement by the accelerometer.

According to some embodiments, adjusting the timing may include reducing how often the wireless transmissions are repetitively broadcast based on a determination that the movement does not satisfy a movement threshold. Broadcasts may be resumed as often as before the reduction in response to a determination that the movement satisfies the movement threshold following the reduction.

According to some embodiments, adjusting the timing may include preventing the broadcast of the wireless transmissions based on a determination that the movement does not satisfy a movement threshold. Broadcasts may be resumed following the prevention of broadcast of the wireless transmissions in response to a determination that the movement satisfies the movement threshold.

According to some embodiments, detecting a movement may include accumulating values indicative of an amount of determined movement during a defined interval. Adjusting the timing may include adjusting the timing between the repetitive broadcasts based on the amount of determined movement not satisfying a movement threshold.

According to some embodiments, the method may further include determining a pattern of timing between movements of the tag and adjusting the timing between the repetitive broadcasts based on the determined pattern of timing.

According to some embodiments, adjusting the timing may include adjusting the timing based on expiration of a threshold time since movement of the tag was last detected.

According to some embodiments, a computer program product may include a non-transitory computer readable storage medium comprising computer readable program code embodied in the medium that when executed by circuit logic of a tag causes the circuit logic to perform operations. The operations may include repetitively broadcasting, from a communication interface of the tag, wireless transmissions comprising a tag identification (ID) of the tag, detecting, by a movement detector of the tag, a movement of the tag with the movement detector and adjusting, by the tag, timing between the repetitive broadcasts based on the movement.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION

Figure 1:
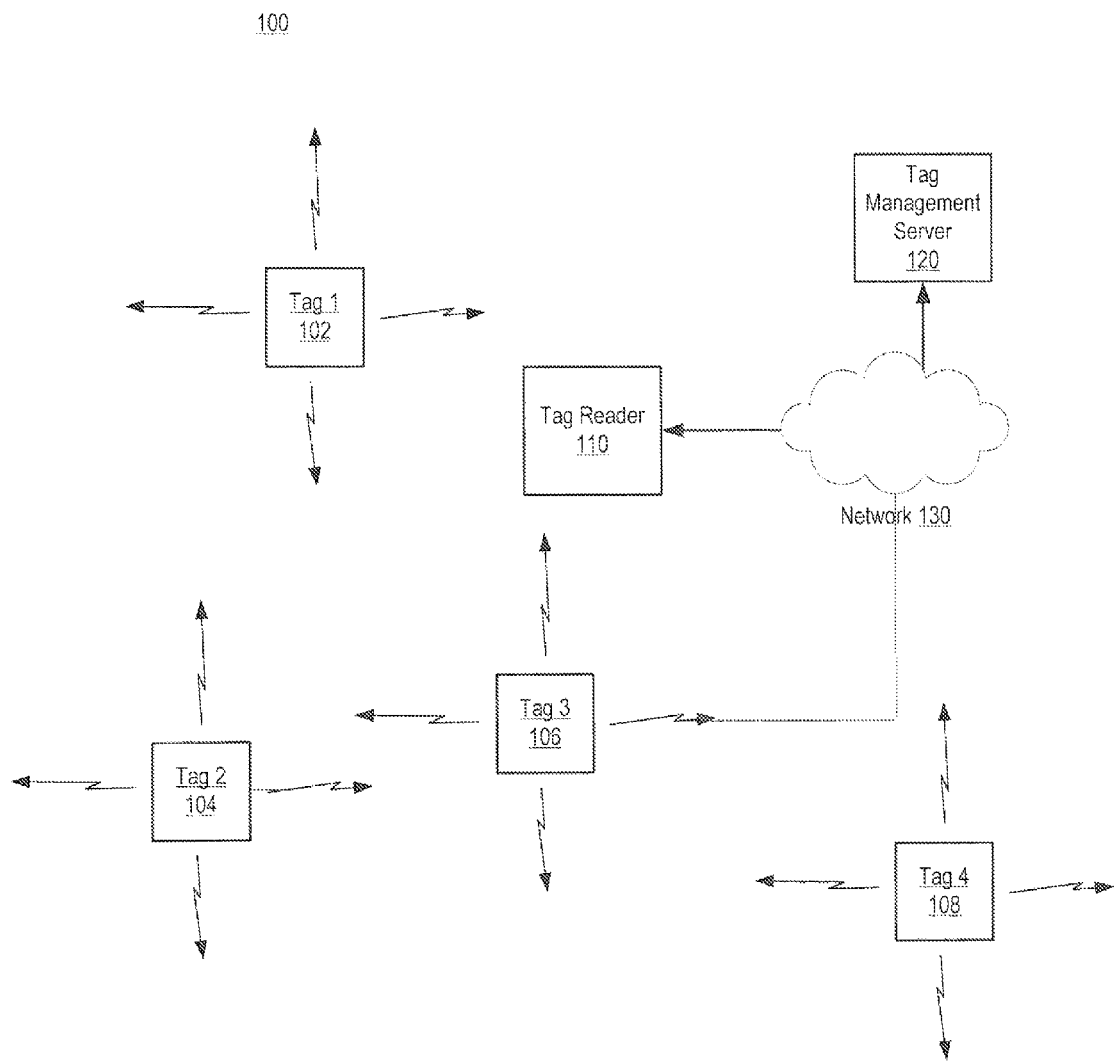
FIG. 1 is a schematic illustration of tags broadcasting wireless transmissions.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "module," "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Tags may be used to track items or people for commercial or personal purposes. The tags may be attached to moveable objects and may be any shape/size that can be incorporated into/on the moveable objects. Moveable objects can include, without limitation, wallets, keys, bags, mobile telephones, clothing, automobiles or other moveable items. Tags may include devices, labels or printed inks on paper.

However, tags have limited power resources. For example, coin cell batteries may support a tag for only a year or two. Frequent broadcasting may exhaust such small power supplies. Embodiments described herein may improve the power efficiency of tags and reduce the use of spectral bandwidth.

Figure 2A:
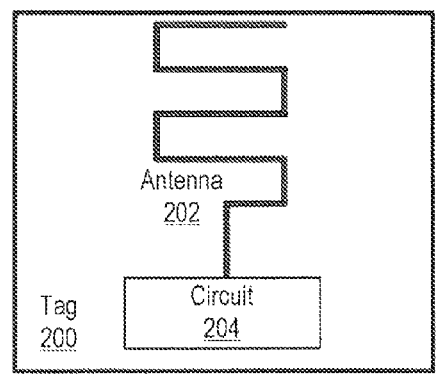
FIGS. 2A-2C are schematic block diagrams that illustrate tags according to some embodiments.
Figure 2B:
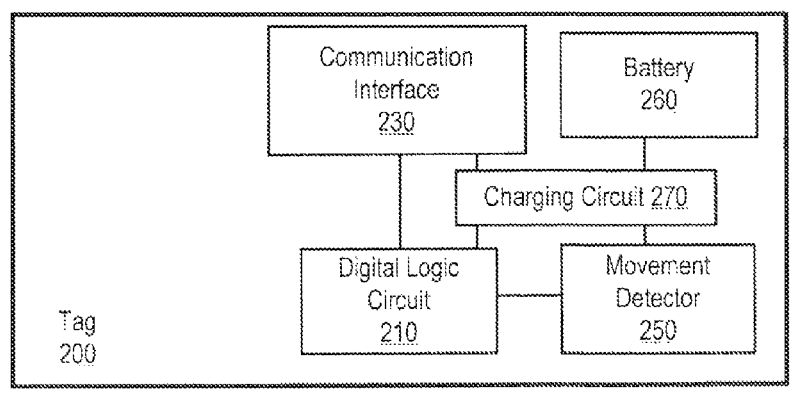
Figure 2C:
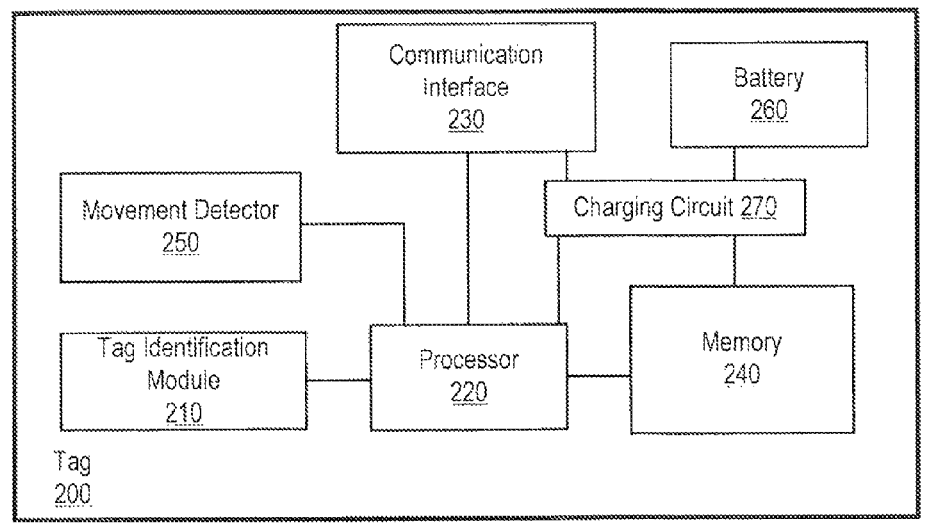

FIG. 1 illustrates a diagram 100 of tags 102-108 that may transmit wireless signals or broadcasts. Tags may transmit wireless signals, such as broadcasts with tag ID information. Many types of tags may lack a power source and transmit a tag ID as an inductive response to a received signal. Other tags may have a power source and/or include additional circuitry for receiving signals and processing commands. FIGS. 2A-2C are block diagrams illustrating a tag 200 according to some embodiments.

FIG. 2A illustrates a block diagram of a simple tag 200 that has an embedded antenna 202 that receives a tag reader signal that energizes tag 200 so that it may have power to transmit a responsive REID signal to the tag reader. Such a tag may also include a circuit 204 for transmitting a tag ID. For example, circuit 204 may include an NFC circuit (accessory NFC circuit) that can be powered by and communicate with a UE NFC circuit using short-range high frequency wireless communication technology which enables the exchange of data between devices over about a 10 cm distance, although the NFC circuits are not limited to operating in at any defined range. The communication protocol and operation can be an extension of the ISO 14443 proximity-card standard (contactless card, RFID) and can be specified in the ECMA-340 and ISO/IEC 18092 technology standards. Some embodiments of the NEC circuits may communicate using existing ISO 14443 smartcards and readers and can thereby be compatible with existing contactless communication infrastructure.

The NFC circuits may communicate via magnetic field induction. A loop antenna connected to the NFC circuit and a loop antenna of the accessory NFC circuit may be placed in close proximity to each other within the other's antenna near field, thereby effectively firming an air-core transformer. Some embodiments of the NFC circuits can transmit within the globally available and unlicensed radio frequency ISM band of 13.56 MHz, with a bandwidth of almost 2 MHz. Some embodiments of the NFC circuits can support data rates of 106, 212, or 424 kbit/s using a modified Miller coding or Manchester coding to encode and decode communicated data.

The accessory NFC circuit can be configured to operate in a passive communication mode, because the tag 200 does not have its own power source. In contrast, the UE NFC circuit can be configured to operate in an active communication mode if the tag 200 has a power source, e.g., rechargeable battery. When operating in the passive communication mode, the UE NFC circuit provides a carrier field and the accessory NFC circuit answers by modulating the carrier field. In this mode, the accessory NFC circuit generates its operating power from the NFC circuit provided electromagnetic field, thus making the accessory NFC circuit a transponder. In some other embodiments the accessory NFC circuit contains a power supply and is configured to operate in an active communication mode.

The NFC circuit includes a charging circuit that can become inductively coupled to the UE NFC circuit through the transceiver circuit to generate power therefrom, and which it provides to a transceiver circuit. The transceiver circuit transmits data through the antenna to the UE NFC circuit using the power from the charging circuit. The transceiver circuit may optionally be configured to receive data through the antenna from the UE NFC circuit.

As illustrated in FIG. 2B, tag 200 may include a communication interface 230. Communication interface 230 may be a transmitter or transmitter circuit to transmit radio frequency communication signals via an antenna system such as a short-range wireless transmitter. The antenna system may include an antenna feed structure and one or more antennas. In some embodiments, communication interface 230 may include a transceiver circuit that is operative to also receive communication signals. Tag 200 may include a digital logic circuit 210, which may be an Application Specific Integrated Circuit (ASIC) circuit or an NFC circuit for transmitting a tag ID and/or for other logic operations. Tag 200 may include a power sources such as battery 260. Battery 260 may be a coin cell battery. Battery 260 may also be a rechargeable battery.

In some embodiments, battery 260 and other components may be connected to charging circuit 270. Charging circuit 270 may be configured to charge battery 260 or provide power to other components. Charging circuit 270 may be configured to charge battery 260 through inductive coupling to a tag reader that transmits a signal, such as tag reader 110. Charging circuit 270 may be energized by tag reader 110 to charge battery 260. In some cases, tag 200 may be powered by a tag reader 110, partially powered by tag reader 110 or powered independent of a battery.

Tag 200 may also include a movement detector 250, such as an accelerometer, tilt detector, etc. Movement detector 250 may be configured to detect changes in gravity or directional force. Movement detector 250 may be able to detect changes in movement in two or three dimensions. Movement detector 250 may provide information about movement of the tag. The information may include an amount of movement and a direction of movement. Movement detector 250 may also include information about a current gravity, an amount of change in gravity and/or a direction in a change of gravity.

In some cases, as shown in FIG. 2C, tag 200 may also include a processor 220 that includes circuits for overall operation of the tag 200 including coordination of communications via communication interface 230. Processor circuit 220 may be configured to communicate data over the communication interface 230 according to one or more short range wireless communication protocols, such as Bluetooth® protocols, ANT protocols, WLAN protocols (e.g., 802.11a, 802.11b, 802.11e, 802.11g, and/or 802.11i), or other short range wireless communication protocols. The communication interface 230 may be, for example, a low power Bluetooth® protocol transmitter or an ANT protocol transmitter, such as those designed and marketed by Dynastream innovations Inc., a Cochrane, Canada based company. This tag 200 may also have an NFC circuit.

The processor 220 may be implemented using a variety of hardware and software. For example, operations of the processor 220 may be implemented using special-purpose hardware, such as an ASIC, and/or programmable logic devices such as gate arrays, and/or software or firmware running on a computing device such as a microprocessor, microcontroller or digital signal processor (DSP).

Tag 200 may also include a tag identification module 210 that operates with memory 240 to store identification information, such as a unique tag ID. The tag ID may also uniquely identify a moveable object attached to the tag. For example, two different moveable objects can have respective tags that each store different ID information that can be used to distinguish the two moveable objects. In some embodiments, tag 200 may have a power source or may be connected to a power source, such as battery 260. Battery 260 and other components may be connected to charging circuit 270. Although different embodiments of tag 200 are shown in FIGS. 2A-2C, tag 200 may comprise any combination of elements shown in FIGS. 2A-2C.

Tags may be registered. Tag registration may be used to connect the owner of a tag to the actual physical tag. Typically, tags are not connected to any user/owner when bought from the store. In order to take ownership of the tag, the user/owner must register themselves as owner of the tag before it is used. The owner of a tag may be permitted to relay any kind of permission to other users once registered. For instance, it may be useful to enable tags to be shared between family members.

As shown in FIG. 1, a tag sensor, such as tag reader 110, may receive wireless transmissions from tags 102-108. In some embodiments, tag reader 110 may be a mobile communication terminal. A mobile communication terminal may be, for example, a smart phone, Personal Data Assistant (PDA), laptop, tablet, scanner or any other mobile computing device that may have capabilities including cellular telecommunication, Internet/intranet access, and/or a global positioning system (GPS) service. The mobile communication terminal may also support Wi-Fi communication over a local wireless network or the like. While tag sensors are generally described herein as mobile devices moving into proximity of a movable object being located, it will be understood that the tag sensors may also be non-mobile devices having locations associated therewith that detect movement of a movable object into their proximity (i.e., within range of a short range wireless protocol network supported by the tag sensor).

Tag reader 110 may format and/or communicate the received tag transmissions to another computer, such as tag management server 120, over network 130. The transmissions may be included in a tag transmission report, which may include one or more tag IDs transmitted once or a number of times. Network 130 may be any network commonly employed to provide voice and data communications to subscribers.

According to some embodiments, tag reader 110 or tag management server 120 can determine location information (or have location information determined), using for example GPS, which may be provided to a location service/computer server (location server) where this location information may be associated with the ID Information for each moveable object. As the location information is periodically determined, it can be used to update the location information for the moveable objects. The location information can also include a time and/or history for each location of the moveable object.

Figure 3:
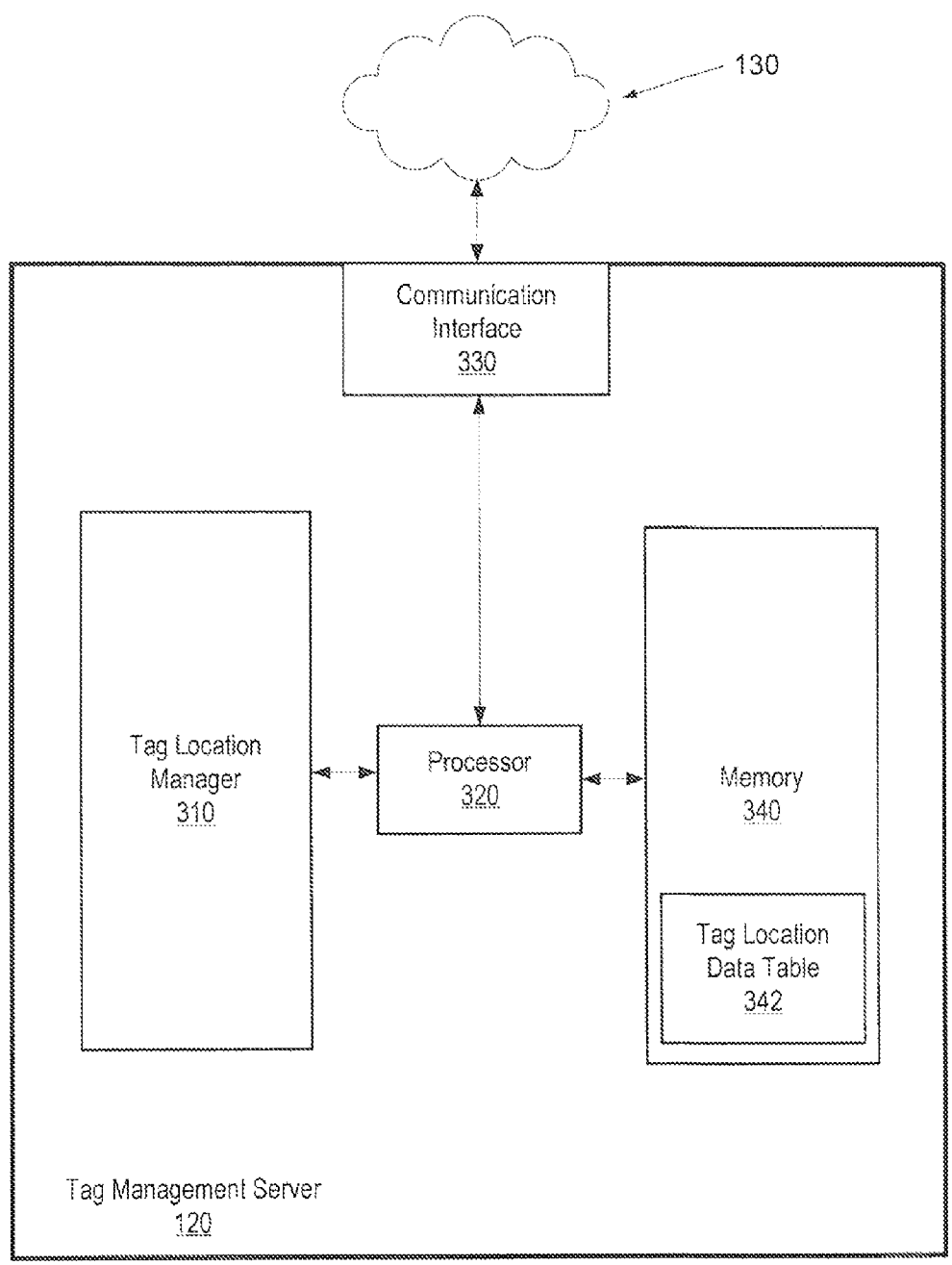
FIG. 3 is a schematic block diagram that illustrates a lag management server according to some embodiments.

FIG. 3 is a block diagram that illustrates a cloud service server, such as tag management server 120, according to some embodiments. Tag management server 120 may include a processor 320 to control a communication interface 330 that receives tag transmission reports from tag reader 110 over network 130.

Tag management server 120 may include a memory 340 including a data structure, such as tag location data table 342, for storing a current location or location history of tags. Other tag information may be stored, such as the type of each tag, location of each tag, how tags are installed, whether tags have a power source, whether the tag is stationary or mobile, or other factors involving the characteristics of the tags and the context of the tags.

Memory 340 may store computer program instructions that, when executed by the processor circuit 320, carry out the operations described herein and shown in the figures. The memory 340 can be a volatile memory or a non-volatile memory, such as EEPROM (flash memory), that retains the stored data while power is removed from the memory 340.

According to some embodiments, a cloud server, such as tag management server 120, may send a control command to tags, individually or collectively. For example, tag management server 120 may send a control command to tag reader 110, which sends a control command to tag 104. Such commands may be addressed specifically to the tags based on an identity of the tags. Once tag 104 receives the control command, it may change its behavior.

Figure 4:
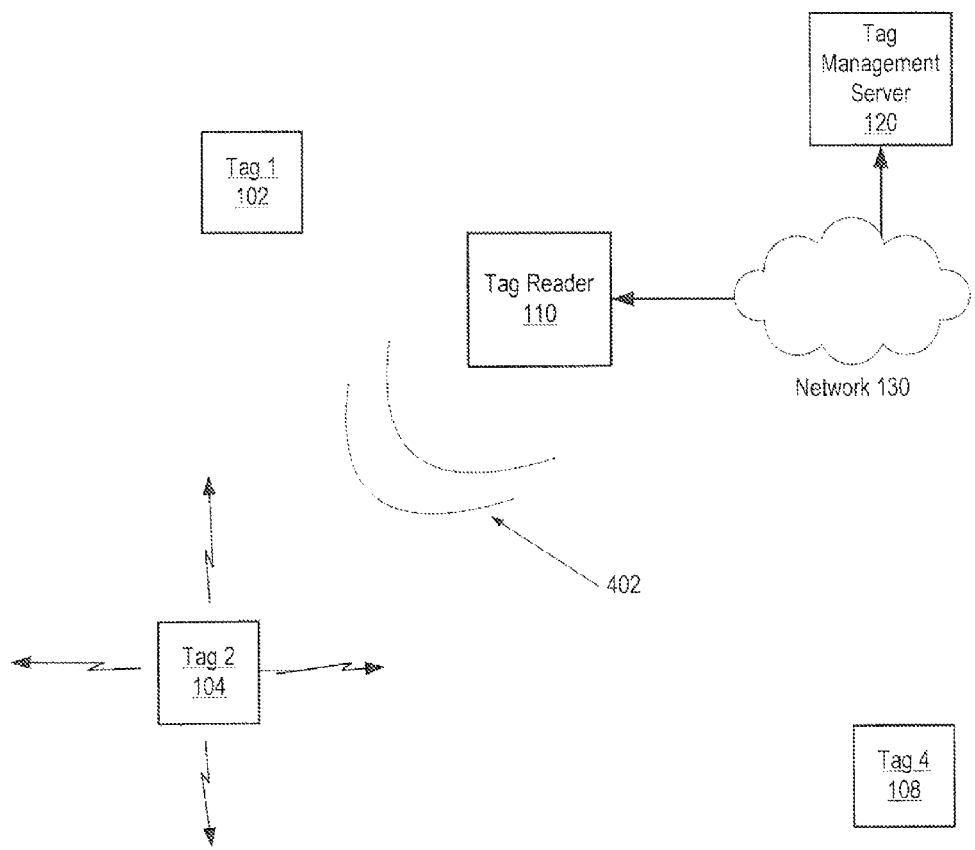
FIG. 4 is a schematic illustration of sending a message to a tag according to some embodiments.

According to some embodiments, tag 200 may receive a confirmation from tag management server 120 indicating that tag management server 120 has received a transmission report of the tag. The transmission report may include geographical location information and the confirmation may indicate that a position of the tag has been acknowledged or recorded. FIG. 4 is a diagram of a tag reader sending a confirmation 402 to tag 200, according to some embodiments.

Figure 5:
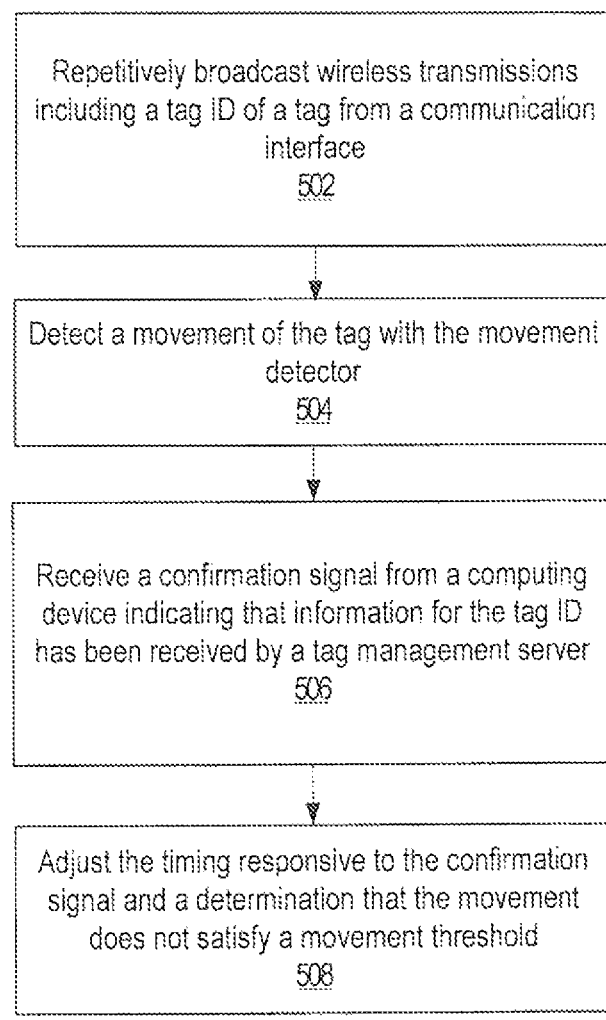
FIG. 5 is a flowchart that illustrates operations of a method for adjusting a tag transmission pattern according to some embodiments.

FIG. 5 is a flowchart that illustrates operations of a method for reducing tag wireless transmission broadcasts, according to some embodiments. In block 502, wireless transmissions are repetitively broadcast from a communication interface of the tag. The broadcasts may be sent according to a transmission pattern. The broadcast may include data such as a tag ID of the tag. The transmission pattern may include any pattern or frequency for broadcasting wireless transmissions from the tag. For example, the transmission pattern may be sending a broadcast once a second.

The tag may become stationary after a period or pattern of movement. A movement of the tag may be detected (block 504). This may include detecting a lack of movement using a movement detector, such as an accelerometer. Detection may include determining that movement of the to detected by the movement detector does not satisfy a movement threshold. The movement threshold may specify a minimum amount of movement.

In some cases, the movement, or lack of movement detected, may satisfy a stationary threshold. For example, a stationary threshold may include very little or no movement. This may include a lack of movement for a certain period of time. If there is no movement for a certain period of time after an event or other designated start of the time period, then the stationary threshold may be satisfied and/or the movement threshold not satisfied.

In some cases, there may be a slight movement detected or some small amount of activity of the movement detector that does not constitute substantial movement of the tag. The wind or the rise and fall of a chest of a breathing human or animal wearing the tag may be causing a slight oscillation in a tag. However, this movement pattern can be distinguished from an amount of acceleration caused by an object being picked up or moved. If the activity falls below a certain level of activity or follows a certain pattern of non-activity, then the movement threshold may not be satisfied. If there is a certain amount of movement or acceleration, then the movement threshold may be satisfied and the tag will not adjust its transmission pattern or reduce its wireless transmissions.

Some movement patterns or requirements may be programmed in the tag and used for comparison. These operations may provide for more accurate data for a tag that is possibly on the move. For example, detecting a movement may include accumulating values indicative of an amount of determined movement during a defined interval. The values may be electric signals, measurements, counts, etc. The timing between the repetitive broadcasts may be adjusted based on the amount not satisfying a movement threshold.

In another example, a pattern of timing between movements of the tag may be determined. The timing may be adjusted based on the determined pattern of timing. For example, the pattern may be lengths of time of little or no movement in between distinct movements of the tag. The lengths may be equal or vary or form a pattern. The timing may also be based on expiration of a threshold time since movement of the tag was last detected. The threshold time may be associated with a counter or timer that is reset upon sufficient movement, or movement satisfying a movement threshold.

In some embodiments, a confirmation signal may be received from a computing device, such as a tag reader or mobile communication terminal, indicating that information for a tag ID has been received by a tag management server or tag tracking server (block 506). The confirmation signal may further indicate that location information for the tag ID has been received by the server or another such computing device. In various embodiments, the confirmation signal may include any other indication that the tag information has been acknowledged by the server and that the tag may change its transmission pattern or adjust the timing of the repetitive broadcasts.

The timing or transmission pattern may be adjusted in response to or based on a determination that the movement does not satisfy a movement threshold. This may involve detecting very little or no movement. The timing may also be adjusted in response to or based on receiving the confirmation signal. That is, the adjustment may take place based on a lack of movement and a notice that it is okay for the tag to change or reduce its transmission pattern. The wireless transmissions are then broadcast according to the adjusted timing, reduced or prevented from being broadcast. For example, the adjusted timing may involve sending a broadcast once a minute rather than once a second. In some embodiments, a discharge rate of battery 260 may be controlled by adjusting the timing between repetitive broadcasts of the wireless transmissions.

There may be a time period between receipt of the confirmation signal and a determination that there is a lack of movement, or vice versa. The adjustment to the timing or transmission pattern may take place if this time period satisfies a timing threshold or a reliability time threshold. For example, the confirmation signal and the determination or detection of a lack of movement may need to take place within a certain period of time so that the server may know that the tag has not moved since its current location has been reported and that the recent tag location information is reliable. The tag may know that it is stationary and as soon as it receives the confirmation signal, it may immediately adjust its timing or transmission pattern. If this reliability time threshold is not satisfied, the transmission pattern may not be adjusted.

According to some embodiments, the transmission pattern may be a frequency of wireless transmissions or how often the wireless transmission broadcasts are repeated. Adjusting the transmission pattern may include reducing a frequency of the wireless transmissions and wireless transmissions may be broadcast according to the reduced frequency. The timing may be adjusted to reduce how often broadcasts are transmitted. In some embodiments, adjusting the transmission pattern may include preventing the broadcast of the wireless transmissions and thus no wireless transmissions are broadcast.

According to some embodiments, wireless transmissions may be broadcast according to the original transmission pattern or a previous transmission pattern in response to detection of movement by the movement detector. This may involve resuming broadcasts as often as before any reduction. This may also involve resuming broadcasts that may have been prevented.

Figure 6:
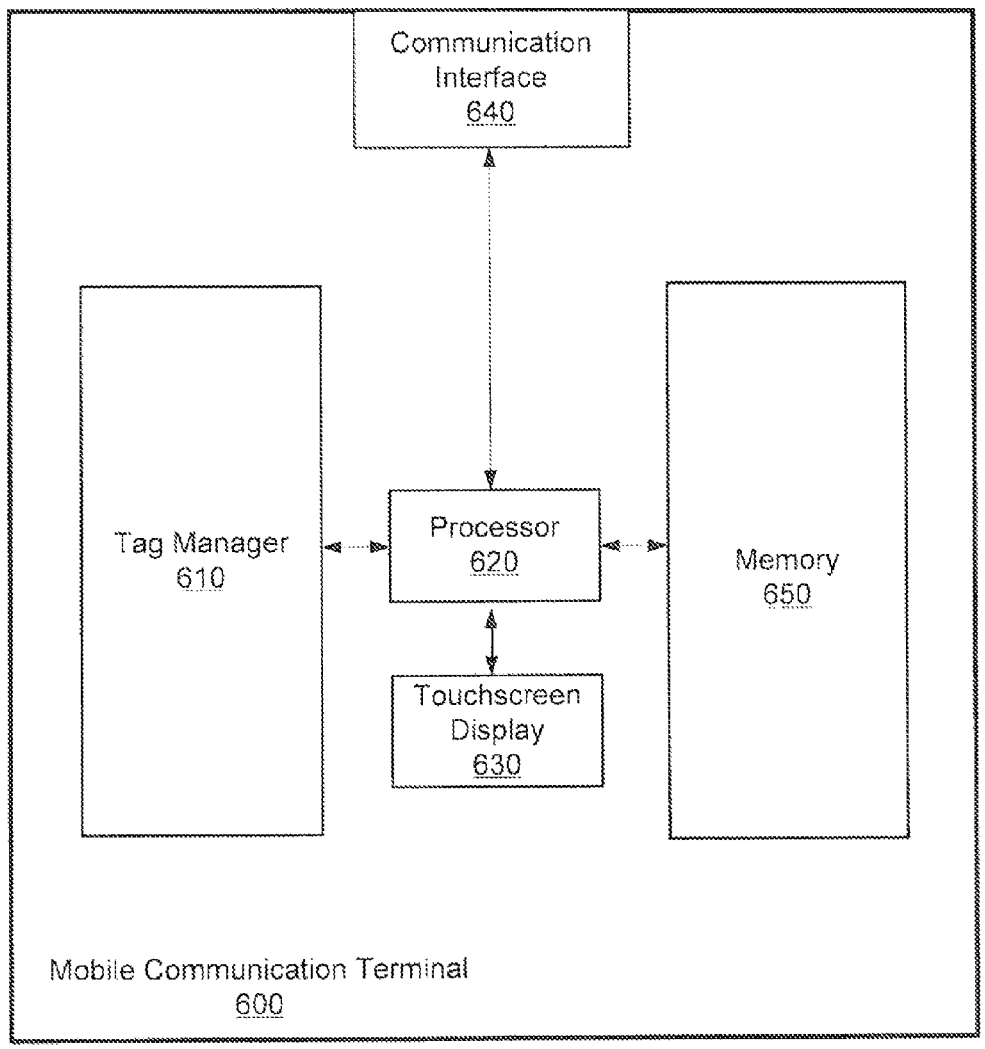
FIG. 6 is a schematic block diagram that illustrates a mobile communication terminal according to some embodiments.

FIG. 6 is a schematic diagram of a mobile communication terminal 600. Mobile communication terminal 600 may receive wireless transmissions from tags and send transmission reports to tag management server 120 through communication interface 640. Processor 620 may cause tag manager 610 to perform actions such as storing tag IDs and associated information for tag transmission reports in a data structure in memory 650. Processor 620 and/or tag manager 610 may be configured to control the sending of transmission reports to tag management server 120. Processor 620 and/or tag manager 610 may also be configured to control the receiving, formatting, addressing and sending of control commands or confirmations to tags. In some cases, mobile communication terminal 600 may perform some or all of the functions of tag management server 120.

Mobile communication terminal 600 may also receive configuration information and provide information through touchscreen display 630. Mobile communication terminal 600 may also include ownership information for the mobile communication terminal 600 in memory 650. In some cases, mobile communication terminal 600 may itself include a tag with ID information that uniquely identifies the mobile communication terminal 600.

Embodiments described herein may provide for improved power efficiency. Since tags are broadcasting less, their batteries will last longer. Also a more silent environment with fewer broadcasts will also cause significantly less communication towards the telecom network. This may decrease the load on the network, the amount of data that needs to be sent and lower the fee for any subscription.

It is to be understood that the present invention is not limited to the particular configuration shown in FIGS. 1 through 6, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture of FIGS. 1 through 6 may be implemented as a single processor system or a multi-processor system in accordance with various embodiments of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A tag comprising:
 a communication interface that is configured to transmit and receive wireless signals;
 a movement detector; and
 a digital logic circuit configured to perform operations comprising:
  repetitively broadcasting wireless transmissions comprising a tag identification (ID) of the tag from the communication interface;
  detecting a movement of the tag with the movement detector;
  receiving a confirmation signal that is sent responsive to the broadcast tag ID at the communications interface of the tag indicating that information for the tag ID that was broadcast has been received; and
  adjusting a timing between the repetitive broadcasts responsive to receiving the confirmation signal and responsive to a determination that the movement does not satisfy a movement threshold.

2. The tag of claim 1, wherein the confirmation signal indicates that location information for the tag ID that was broadcast has been received by a computing device that is separate from the tag.

3. The tag of claim 1, wherein the operations further comprise adjusting the timing responsive to a time period between receipt of the confirmation signal and the determination satisfying a reliability time threshold.

4. The tag of claim 1, wherein the movement detector comprises an accelerometer, and wherein the operations further comprise adjusting the timing between the repetitive broadcasts based on detecting a lack of movement using the accelerometer.

5. The tag of claim 1, wherein adjusting the timing comprises reducing how often the wireless transmissions are repetitively broadcast based on the determination that the movement does not satisfy a movement threshold.

6. The tag of claim 5, wherein the operations further comprise resuming broadcast of the wireless transmissions as often as before the reduction in response to a determination that the movement satisfies the movement threshold following the reduction.

7. The tag of claim 1, wherein adjusting the timing comprises preventing the broadcast of the wireless transmissions based on the determination that the movement does not satisfy a movement threshold.

8. The tag of claim 7, wherein the operations further comprise resuming the broadcast of the wireless transmissions following the prevention of broadcast of the wireless transmissions in response to a determination that the movement satisfies the movement threshold.

9. The tag of claim 1, wherein detecting a movement comprises accumulating values indicative of an amount of determined movement during a defined interval, and wherein adjusting the timing comprises adjusting the timing between the repetitive broadcasts based on the amount of determined movement not satisfying a movement threshold.

10. The tag of claim 1, wherein the operations further comprise:
    determining a pattern of timing between movements of the tag; and
    adjusting the timing between the repetitive broadcasts based on the determined pattern of timing.

11. The tag of claim 1, wherein adjusting the timing comprises adjusting the timing based on expiration of a threshold time since movement of the tag was last detected.

12. A method comprising:
    repetitively broadcasting, from a communication interface of a tag, wireless transmissions comprising a to identification (ID) of the tag;
    detecting, by a movement detector of the tag, a movement of the tag with the movement detector;
    receiving a confirmation signal that is sent responsive to the broadcast tag ID at the communications interface of the tag indicating that information for the tag ID that was broadcast has been received; and
    adjusting, by the tag, a timing between the repetitive broadcasts responsive to receiving the confirmation signal and responsive to a determination that the movement does not satisfy a movement threshold.

13. The method of claim 12, wherein adjusting the timing comprises reducing how often the wireless transmissions are repetitively broadcast based on the determination that the movement does not satisfy a movement threshold.

14. The method of claim 13, further comprising resuming broadcast of the wireless transmissions as often as before the reduction in response to a determination that the movement satisfies the movement threshold following the reduction.

15. The method of claim 12, wherein adjusting the timing comprises preventing the broadcast of the wireless transmissions based on the determination that the movement does not satisfy a movement threshold.

16. The method of claim 15, farther comprising resuming the broadcast of the wireless transmissions following the prevention of broadcast of the wireless transmissions in response to a determination that the movement satisfies the movement threshold.

17. The method of claim 12, wherein detecting a movement comprises accumulating values indicative of an amount of determined movement during a defined interval, and wherein adjusting the timing comprises adjusting the timing between the repetitive broadcasts based on the accumulated values not satisfying a movement threshold.

18. A computer program product, comprising:
    a non-transitory computer readable storage medium comprising computer readable program code embodied in the medium that when executed by circuit logic of a tag causes the circuit logic to perform operations comprising:
    repetitively broadcasting, from a communication interface of the tag, wireless transmissions comprising a tag identification (ID) of the tag;
    detecting, by a movement detector of the tag, a movement of the tag with the movement detector;
    receiving a confirmation signal that is sent responsive to the broadcast tag ID at the communications interface of the tag indicating that information for the tag ID that was broadcast has been received; and
    adjusting, by the tag, a timing between the repetitive broadcasts responsive to receiving the confirmation signal and responsive to a determination that the movement does not satisfy a movement threshold.

19. The method of claim 12, wherein the confirmation signal indicates that location information for the tag ID that was broadcast has been received by a computing device that is separate from the tag.

20. The computer program product of claim 18, wherein the confirmation signal indicates that location information for the tag ID that was broadcast has been received by a computing device that is separate from the tag.

* * * * *

UNITED STATES PATENT AND TRADEMARK OFFICE
CERTIFICATE OF CORRECTION

PATENT NO. : 9,460,323 B2  
APPLICATION NO. : 14/311576  
DATED : October 4, 2016  
INVENTOR(S) : Sandell et al.

Page 1 of 1

It is certified that error appears in the above-identified patent and that said Letters Patent is hereby corrected as shown below:

In the Specification  
Column 5, Line 3: Please correct "NEC" to read -- NFC --  
Column 5, Line 4: Please correct "NEC" to read -- NFC --  
Column 5, Line 5: Please correct "NEC" to read -- NFC --  
Column 5, Line 8: Please correct "NEC" to read -- NFC --

In the Claims  
Column 11, Claim 10, Line 14: Please correct "farther" to read -- further --  
Column 11, Claim 12, Line 25: Please correct "to" to read -- tag --  
Column 12, Claim 16, Line 5: Please correct "farther" to read -- further --

Signed and Sealed this  
Ninth Day of May, 2017

Michelle K. Lee  
*Director of the United States Patent and Trademark Office*